(12) United States Patent
Okazaki et al.

(10) Patent No.: US 12,420,634 B2
(45) Date of Patent: Sep. 23, 2025

(54) ELECTRIC WORK VEHICLE

(71) Applicant: Kubota Corporation, Osaka (JP)

(72) Inventors: Kazuto Okazaki, Sakai (JP); Masaaki Nishinaka, Sakai (JP); Tatsuya Yamaguchi, Sakai (JP); Daiki Yasui, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/672,061

(22) Filed: May 23, 2024

(65) Prior Publication Data

US 2024/0308334 A1  Sep. 19, 2024

Related U.S. Application Data

(63) Continuation of application No. PCT/JP2022/038611, filed on Oct. 17, 2022.

(30) Foreign Application Priority Data

Dec. 27, 2021 (JP) ................................ 2021-213187

(51) Int. Cl.
*B60K 26/02* (2006.01)
*B60L 58/10* (2019.01)

(52) U.S. Cl.
CPC .............. *B60K 26/02* (2013.01); *B60L 58/10* (2019.02); *B60K 2026/025* (2013.01); *B60L 2200/40* (2013.01); *B60Y 2200/223* (2013.01)

(58) Field of Classification Search
CPC ... B60K 26/02; B60K 2026/025; B60L 58/10; B60L 2200/40; B60Y 2200/223
See application file for complete search history.

(56) References Cited

U.S. PATENT DOCUMENTS

| | | | |
|---|---|---|---|
| 7,591,159 B2 * | 9/2009 | Tsuchikiri | B60R 25/2063 70/423 |
| 2015/0359168 A1 * | 12/2015 | Higashikawa | A01D 34/66 56/14.7 |
| 2022/0234434 A1 | 7/2022 | Tottori et al. | |

FOREIGN PATENT DOCUMENTS

| | | | |
|---|---|---|---|
| CN | 205319068 U | * | 6/2016 |
| CN | 113665434 A | * | 11/2021 |
| JP | 2013248918 A | * | 12/2013 |
| JP | 2021-953 A | | 1/2021 |

OTHER PUBLICATIONS

JP-2013248918-A Machine English Translation (Year: 2013).*
CN-205319068-U Machine English Translation (Year: 2016).*
CN-113665434-A Machine English Translation (Year: 2021).*
Official Communication issued in International Patent Application No. PCT/JP2022/038611, mailed on Dec. 27, 2022.

* cited by examiner

*Primary Examiner* — Jason D Shanske
*Assistant Examiner* — Matthew James O'Neill
(74) *Attorney, Agent, or Firm* — Keating & Bennett, LLP

(57) ABSTRACT

An electric work vehicle includes a battery, a motor drivable by power supplied from the battery, a travel device drivable by the motor, a steering wheel operable to steer the travel device, an operation panel below the steering wheel, and a motor power supply operator to turn power supply to the motor on and off. The motor power supply operator is located on the operation panel and overlapping the steering wheel as viewed in a direction of a rotation axis of the steering wheel.

7 Claims, 6 Drawing Sheets

ELECTRIC WORK VEHICLE

CROSS REFERENCE TO RELATED APPLICATIONS

This application claims the benefit of priority to Japanese Patent Application No. 2021-213187 filed on Dec. 27, 2021 and is a Continuation application of PCT Application No. PCT/JP2022/038611 filed on Oct. 17, 2022. The entire contents of each application are hereby incorporated herein by reference.

BACKGROUND OF THE INVENTION

1. Field of the Invention

The present invention relates to electric work vehicles.

2. Description of the Related Art

Conventionally, an electric work vehicle such as, for example, the electric work vehicle disclosed in JP 2021-953A is known. The electric work vehicle disclosed in JP 2021-953A includes a battery ("battery [4]"), a motor ("motor [M]") driven by power supplied from the battery, a travel device ("front wheels [10]" and "rear wheels [11]") driven by the motor, and a steering wheel ("steering wheel [32]") for steering the travel device.

SUMMARY OF THE INVENTION

An electric work vehicle as described above typically includes a motor power supply operator to turn on and off power supply to a motor. In the above-described electric work vehicle, if a driver accidentally contacts the motor power supply operator, the motor will operate improperly.

In view of the above-described circumstances, there is a demand for an electric work vehicle that can prevent a driver from accidentally contacting a motor power supply operator.

According to an example embodiment of the present invention, an electric work vehicle includes a battery, a motor drivable by power supplied from the battery, a travel device drivable by the motor, a steering wheel operable to steer the travel device, an operation panel below the steering wheel, and a motor power supply operator to turn power supply to the motor on and off, wherein the motor power supply operator is on the operation panel and overlapping the steering wheel as viewed in a direction of a rotation axis of the steering wheel.

According to this example configuration, the motor power supply operator is hidden behind the steering wheel. With this, even when the driver accidentally approaches contact with the motor power supply operator, the steering wheel can shield or block the driver's hands. In other words, it is possible to realize an electric work vehicle that can prevent a driver from accidentally contacting a motor power supply operator.

Furthermore, in an example embodiment of the present invention, preferably, the motor power supply operator is on an inner side of an outer circumference of the steering wheel.

According to this example configuration, the motor power supply operator is located near the steering wheel. This enables the driver to easily view the motor power supply operator while preventing the driver from accidentally contacting the motor power supply operator.

Furthermore, in an example embodiment of the present invention, preferably, the motor power supply operator is at a position different from a position at which a work device operator to operate a work device is located.

According to this example configuration, when the driver operates a work device operator, the driver can be prevented from accidentally contacting the motor power supply operator.

Furthermore, in an example embodiment of the present invention, preferably, the operation panel includes a meter panel, and the motor power supply operator is located in a vicinity of the meter panel.

According to this example configuration, the driver can easily view the meter panel while operating the motor power supply operator.

Furthermore, in an example embodiment of the present invention, preferably, the motor power supply operator is on one of left and right sides of the rotation axis.

According to this example configuration, by locating the motor power supply operator on one of the left and right sides of the rotation axis and another device operator on the other one of the left and right sides of the rotation axis, it is possible to improve or optimize the layout of the motor power supply operator and the another device operator.

Furthermore, in an example embodiment of the present invention, preferably, the motor power supply operator includes a plug-in key and a button, and power supply to the motor is turned on and off in response to the button being pressed while the plug-in key is plugged in.

According to this example configuration, even when the button is pressed while the key is not plugged in, power supply to the motor is not turned on and off. Accordingly, due to the two-step operation (key plug-in and button pressing) performed by the driver, it is possible to ensure that the motor does not operate improperly.

Furthermore, in an example embodiment of the present invention, preferably, the motor power supply operator includes a case, and the case has a drainage hole.

According to this example configuration, even if water enters the case, it is possible to drain the water that has entered the case, through the drain hole.

Furthermore, in an example embodiment of the present invention, preferably, the electric work vehicle further includes a cover covering the operation panel, wherein a controller connected to the motor power supply operator is inside the cover.

According to this example configuration, the motor power supply operator and the controller are close to each other. With this, short harnesses can be used to connect the motor power supply operator and the controller.

The above and other elements, features, steps, characteristics and advantages of the present invention will become more apparent from the following detailed description of the example embodiments with reference to the attached drawings.

BRIEF DESCRIPTION OF THE DRAWINGS

FIG. 2 is a left side view showing a layout of an inverter and the like.

DETAILED DESCRIPTION OF THE EXAMPLE EMBODIMENTS

Figure 1:
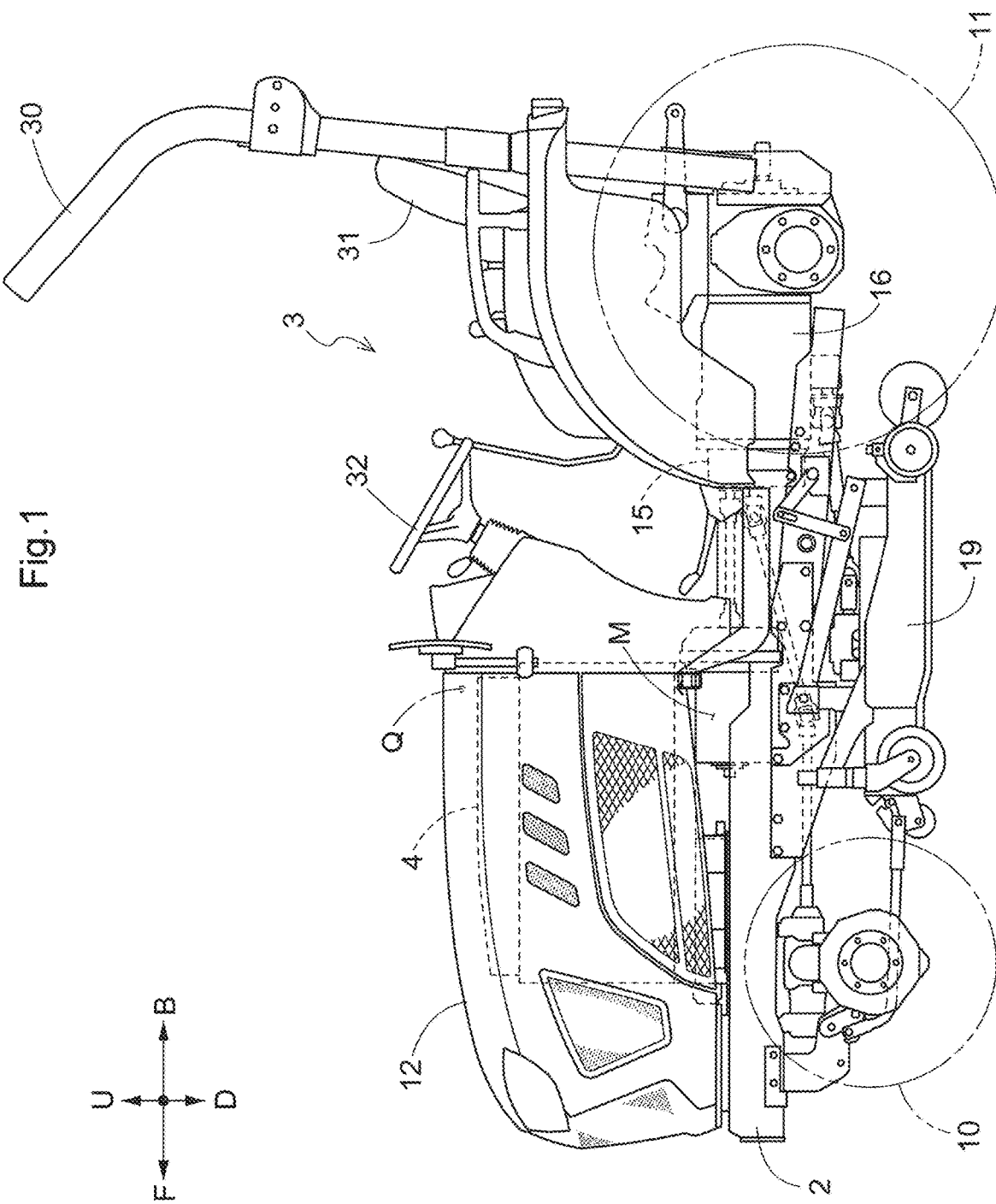
FIG. 1 is a left side view of a tractor.

Example embodiments of the present invention will be described based on the drawings. In the following description, unless otherwise stated, the direction of an arrow F and the direction of an arrow B in the drawings will be respectively referred to as "the front side" and "the rear side", and the direction of an arrow L and the direction of an arrow R in the drawings will be respectively referred to as "the left side" and "the right side". Also, the direction of an arrow U and the direction of an arrow D in the drawings will be respectively referred to as "the upper side" and "the lower side".

The following describes a tractor according to the present example embodiment. As shown in FIG. 1, the tractor includes left and right front wheels 10, left and right rear wheels 11, and a cover 12.

The tractor also includes a body frame 2 and a driving section 3. The body frame 2 is supported by the left and right front wheels 10 and the left and right rear wheels 11.

The cover 12 is disposed in a front portion of the body of the tractor. The driving section 3 is behind the cover 12. In other words, the cover 12 is in front of the driving section 3.

The driving section 3 includes a protective frame 30, a driver's seat 31, and a steering wheel 32. A driver can sit on the driver's seat 31. Accordingly, the driver can ride in the driving section 3. The driver steers the left and right front wheels 10 by operating the steering wheel 32. The driver can perform various driving operations in the driving section 3.

The tractor includes a battery 4. The cover 12 is pivotable about an opening/closing axis Q extending in the left-right direction of the body. Accordingly, the cover 12 is openable and closable. When the cover 12 is closed, the battery 4 is covered by the cover 12.

Figure 2:
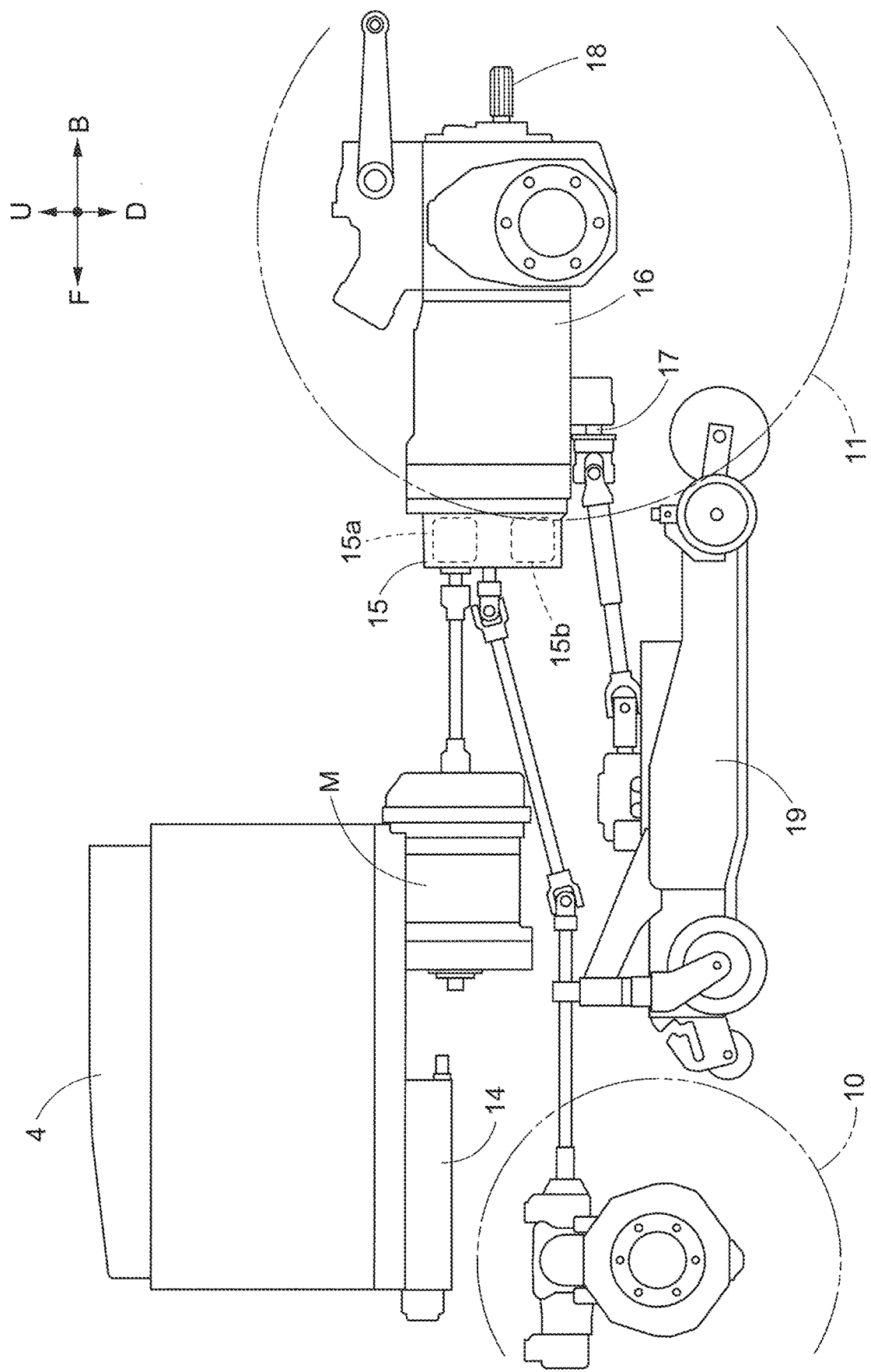

As shown in FIG. 2, the tractor includes an inverter 14 and a motor M. The battery 4 supplies power to the inverter 14. The inverter 14 converts DC power supplied from the battery 4 to AC power, and supplies the AC power to the motor M. The motor M is driven by the AC power supplied from the inverter 14.

Figure 3:
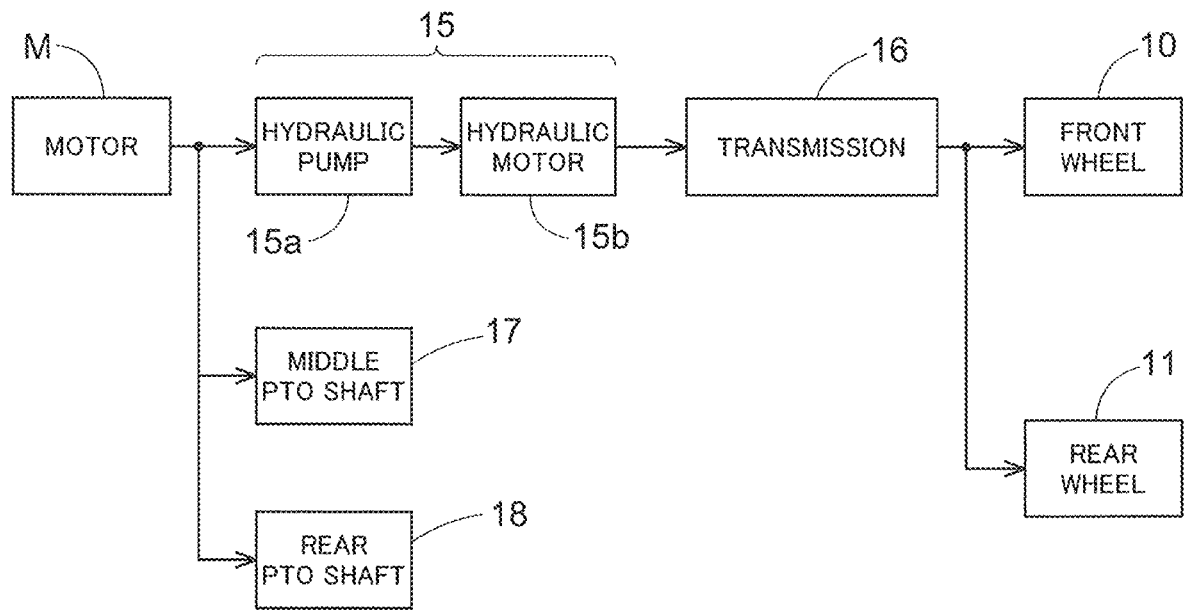
FIG. 3 is a diagram showing a flow of a motive power transmission.

As shown in FIGS. 2 and 3, the tractor includes a hydraulic continuously variable transmission 15 and a transmission 16. As shown in FIG. 3, the hydraulic continuously variable transmission 15 includes a hydraulic pump 15a and a hydraulic motor 15b.

The hydraulic pump 15a is driven by rotational motive power transmitted from the motor M. As a result of the hydraulic pump 15a being driven, rotational motive power is output from the hydraulic motor 15b. The hydraulic continuously variable transmission 15 is configured to change the speed of rotational motive power between the hydraulic pump 15a and the hydraulic motor 15b. Also, the hydraulic continuously variable transmission 15 is configured to be capable of changing the transmission ratio in a stepless manner.

The rotational motive power output from the hydraulic motor 15b is transmitted to the transmission 16. The speed of the rotational motive power transmitted to the transmission 16 is changed by a gear transmission mechanism included in the transmission 16, and the rotational motive power is distributed to the left and right front wheels 10 and the left and right rear wheels 11. Thus, the left and right front wheels 10 and the left and right rear wheels 11 are driven.

As shown in FIGS. 2 and 3, the tractor also includes a middle PTO shaft 17 and a rear PTO shaft 18. Rotational motive power output from the motor M is distributed to the hydraulic pump 15a, the middle PTO shaft 17, and the rear PTO shaft 18. The middle PTO shaft 17 and the rear PTO shaft 18 are rotated by the distributed rotational motive power.

If a work device is connected to the middle PTO shaft 17 or the rear PTO shaft 18, the work device is driven by rotational motive power transmitted by the middle PTO shaft 17 or the rear PTO shaft 18. For example, in the present example embodiment, a grass cutting device 19 is connected to the middle PTO shaft 17 as shown in FIG. 2. The grass cutting device 19 is driven by rotational motive power transmitted by the middle PTO shaft 17.

Figure 4:
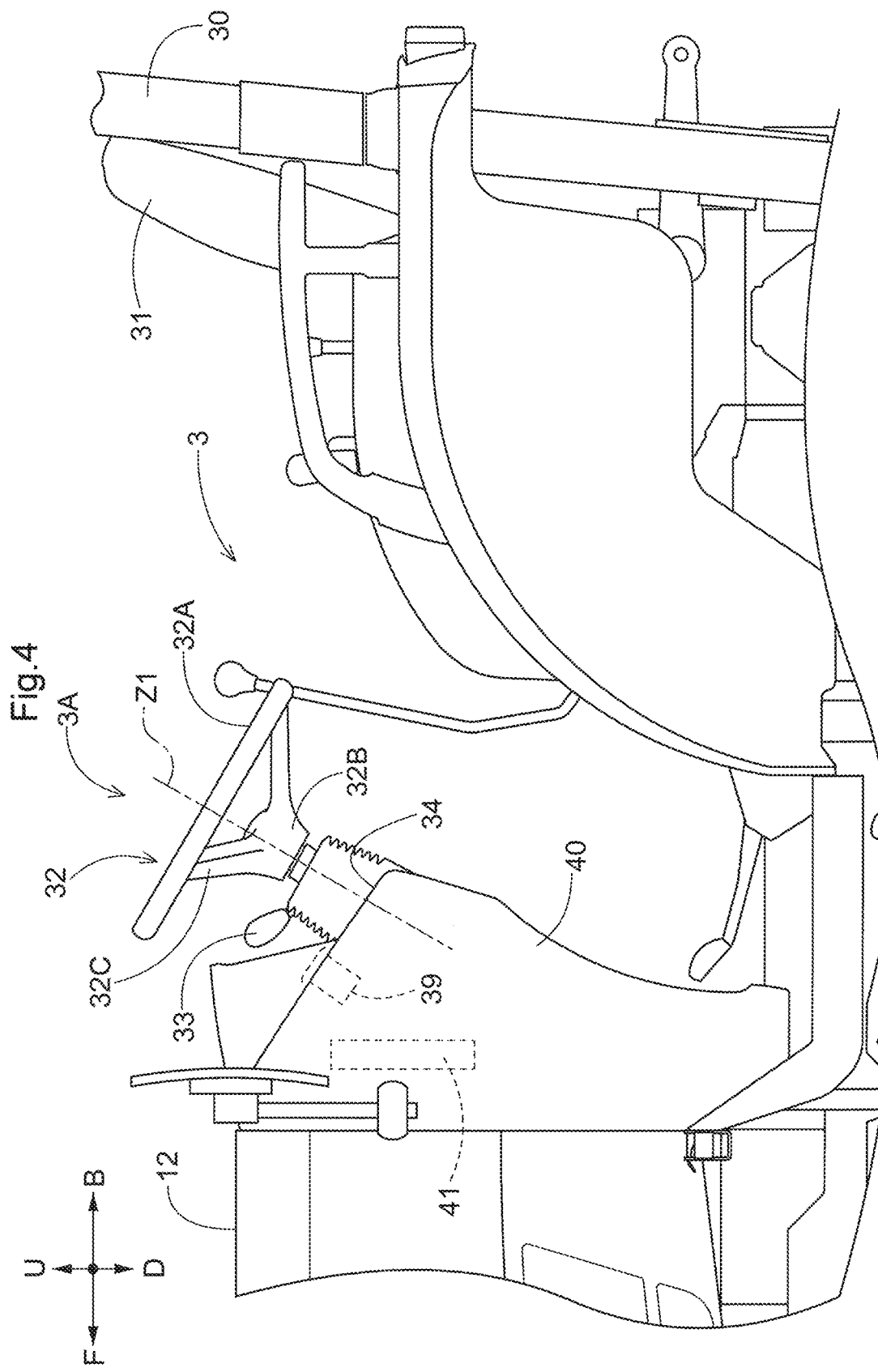
FIG. 4 is a left side view showing a driving section.
Figure 5:
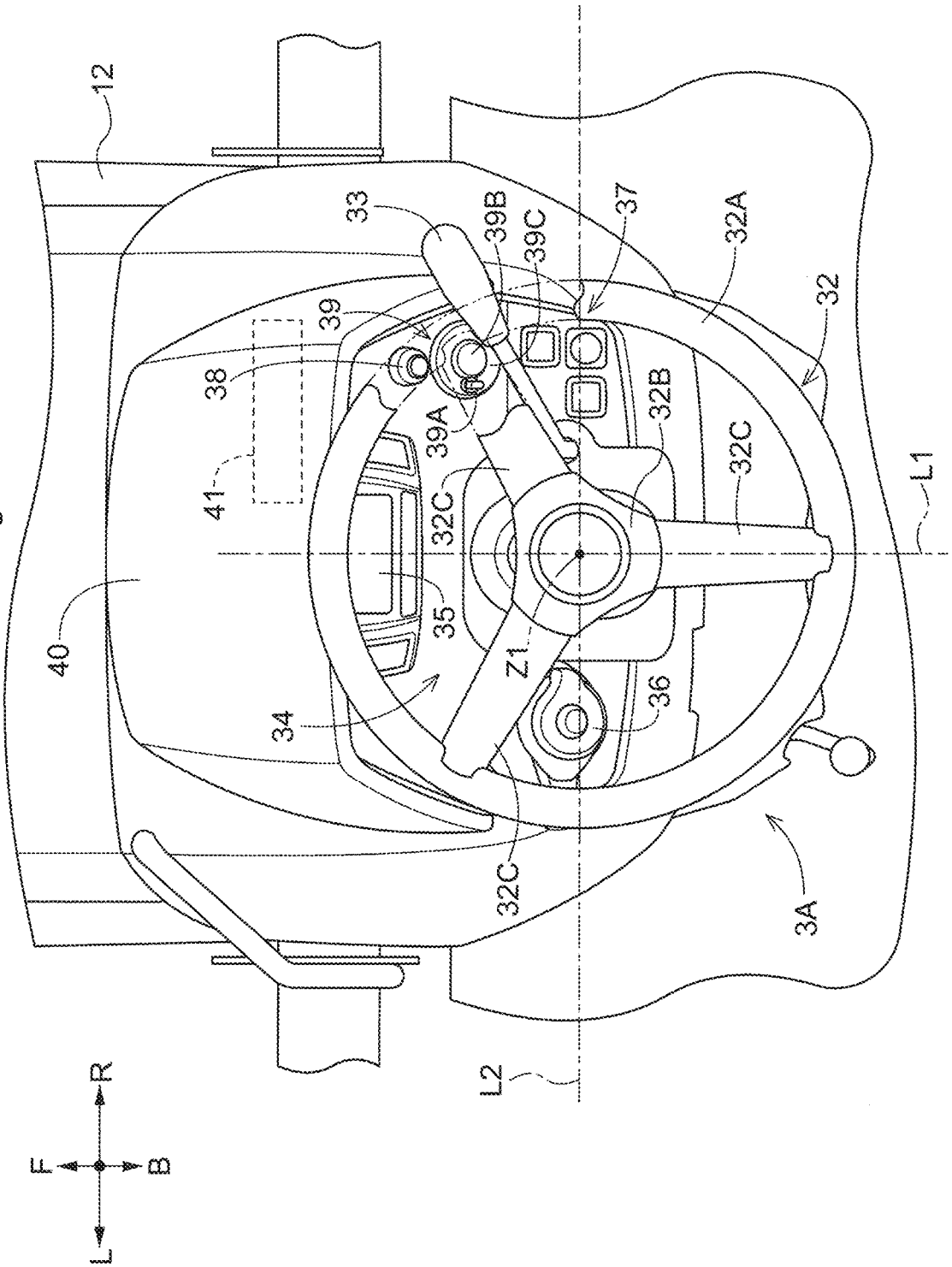
FIG. 5 is a diagram showing a steering unit when viewed in the direction of a rotation axis.

As shown in FIGS. 4 and 5, the driving section 3 includes a steering unit 3A. The steering unit 3A is disposed in front of the driver's seat 31. The steering unit 3A includes a steering wheel 32, an acceleration lever 33, an operation panel 34, and a cover 40.

The steering wheel 32 is operable to steer the left and right front wheels 10. The steering wheel 32 is configured to be rotatable about a rotation axis Z1. The rotation axis Z1 is set in an orientation in which it is inclined to the rear. The steering wheel 32 includes a circular rim 32A, a hub 32B coupled to a steering shaft (not shown), and a spork 32C coupling the rim 32A and the hub 32B to each other.

The acceleration lever 33 is disposed below the steering wheel 32. The acceleration lever 33 is operable to change the number of rotations of the motor M.

The operation panel 34 is disposed below the steering wheel 32. The operation panel 34 includes a meter panel 35, a combination switch 36, switches 37, a display switch 38, and a motor power supply operator 39.

The meter panel 35 may include a liquid crystal panel, for example. Various information (such as the vehicle speed and the tractor use time) are displayed on the meter panel 35.

The combination switch 36 is usable to operate a blinker, headlights, and the like. The switches 37 include a switch to operate a horn and a switch to operate lights. In other words, the combination switch 36 and the switches 37 define and function as switches usable during driving. The display switch 38 is operable to switch the display of the meter panel 35.

The outer edge of the operation panel 34 is covered by the cover 40. The cover 40 is provided on the rear side of the cover 12 so as to be continuous with the rear end of the cover 12.

As shown in FIG. 5, the motor power supply operator 39 is operable to turn on and off power supply to the motor M. The motor power supply operator 39 overlaps the rim 32A and the spork 32C when viewed in the direction of the rotation axis Z1. In other words, the motor power supply operator 39 is provided on the operation panel 34 and overlaps the steering wheel 32 when viewed in the direction of the rotation axis Z1. The motor power supply operator 39 does not protrude outward from the outer circumference of the rim 32A. In other words, the motor power supply operator 39 is disposed on the inner side of the outer circumference of the steering wheel 32.

In FIG. 5, the straight line extending in the front-rear direction of the body while passing through the rotation axis Z1 is denoted as "L1", and the straight line extending in the left-right direction of the body while passing through the rotation axis z1 is denoted as "L2". The motor power supply operator 39 is disposed on the right side of the straight line L1. In other words, the motor power supply operator 39 is disposed on the right side of the rotation axis Z1. The motor power supply operator 39 is disposed on the upper side of the straight line L2. In other words, the motor power supply operator 39 is disposed on the upper side of the rotation axis Z1.

The motor power supply operator 39 is disposed in the vicinity of the meter panel 35. In the present example embodiment, the motor power supply operator 39 is disposed on a lower right side of the meter panel 35 when viewed in the direction of the rotation axis Z1. Specifically, the motor power supply operator 39 is disposed below the display switch 38 and above the switches 37 and the acceleration lever 33, when viewed in the direction of the rotation axis Z1. Since the work device operator (such as a work operation lever) to operate the work device is disposed next to the driver's seat 31 (see FIG. 4), the motor power supply operator 39 is disposed at a position different from the position at which the work device operator is disposed.

Figure 6:
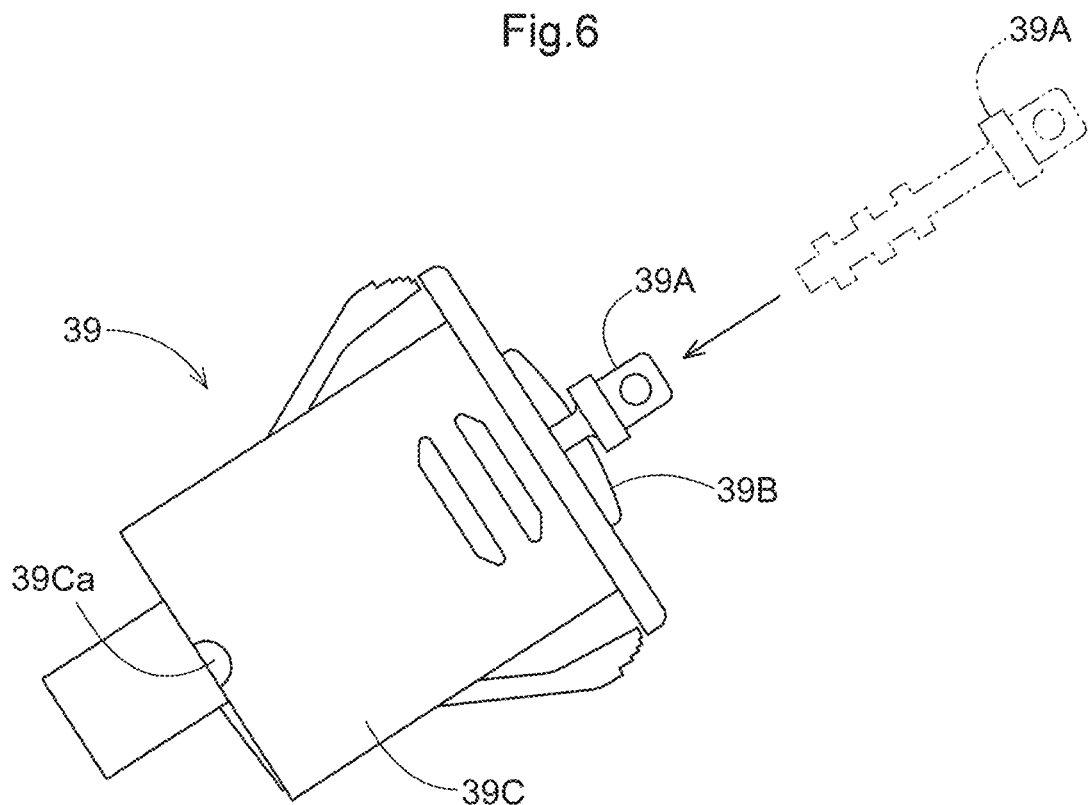
FIG. 6 is a left side view showing a motor power supply operator.

As shown in FIGS. 5 and 6, the motor power supply operator 39 includes a plug-in key 39A, a button 39B, and a case 39C. When the button 39B is pressed while the key 39A is plugged in, power supply to the motor M is turned on and off. In other words, if the button 39B is pressed while the key 39A is not plugged in, power supply to the motor M will not be turned on and off.

The motor power supply operator 39 preferably has a waterproof structure. The case 39C has a drainage hole 39Ca. The drainage hole 39Ca is in the bottom of the case 39C.

Figure 7:
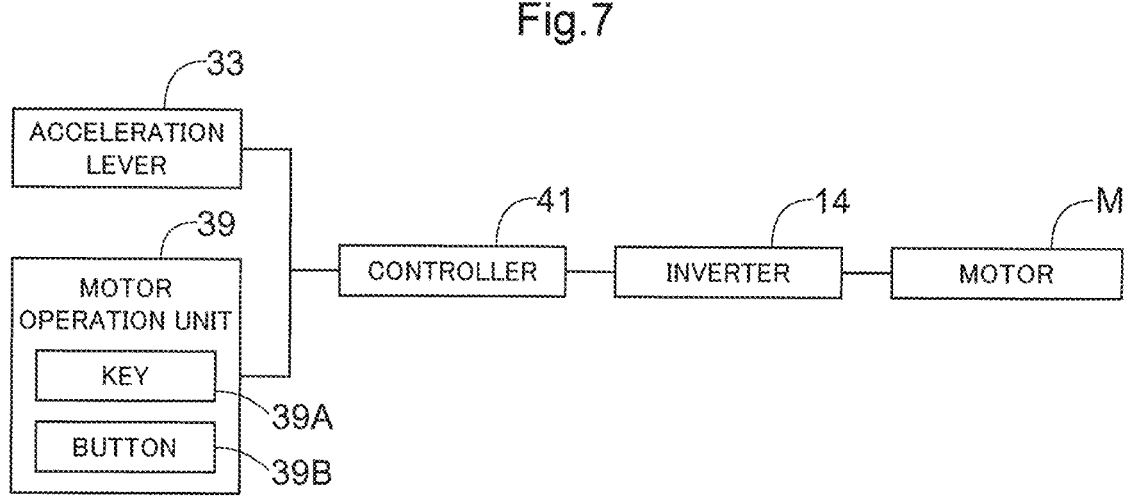
FIG. 7 is a diagram showing a configuration used to control a motor.

As shown in FIG. 7, the configuration to control the motor M includes the acceleration lever 33, the motor power supply operator 39, a controller 41, the inverter 14, and the motor M. The acceleration lever 33 and the motor power supply operator 39 are connected to the controller 41 via harnesses. The controller 41 is connected to the inverter 14 via harnesses. The inverter 14 is connected to the motor M via a harness. The controller 41 is configured or programmed to instruct the inverter 14 in accordance with instructions given from the acceleration lever 33 and the motor power supply operator 39. The inverter 14 is configured to control outputs from the motor M in accordance with an instruction from the controller 41.

As shown in FIGS. 4 to 5, the controller 41 is provided inside the cover 40. The controller 41 is disposed on the right side of the rotation axis Z1. In other words, the controller 41 is disposed on the same side with respect to the rotation axis Z1 in the left-right direction of the body as the side on which the motor power supply operator 39 is disposed.

Other Example Embodiments (1) In the above-described example embodiments, the motor power supply operator 39 overlaps the rim 32A and the spork 32C when viewed in the direction of the rotation axis Z1. However, the motor power supply operator 39 may overlap only with the rim 32A when viewed in the direction of the rotation axis Z1. Alternatively, the motor power supply operator 39 may also overlap only with the spork 32C when viewed in the direction of the rotation axis Z1.

(2) In the above-described example embodiments, the motor power supply operator 39 does not protrude outward from the outer circumference of the rim 32A. However, the motor power supply operator 39 may protrude outward from the outer circumference of the rim 32A as long as it overlaps the steering wheel 32 when viewed in the direction of the rotation axis Z1.

(3) In the above-described example embodiments, the motor power supply operator 39 is disposed at a position different from the position at which the work device operator is disposed. However, the motor power supply operator 39 and the work device operator may be provided on the operation panel 34. That is to say, the motor power supply operator 39 may be disposed at the same position as the position at which the work device operator is disposed.

(4) In the above-described example embodiments, the motor power supply operator 39 is disposed in the vicinity of the meter panel 35. However, the motor power supply operator 39 does not need to be disposed in the vicinity of the meter panel 35 as long as the motor power supply operator 39 is provided on the operation panel 34.

(5) In the above-described example embodiments, the motor power supply operator 39 is disposed on the right side of the rotation axis Z1. However, the motor power supply operator 39 may be disposed on the left side of the rotation axis Z1. Alternatively, the motor power supply operator 39 may also be disposed on the rotation axis Z1.

(6) In the above-described example embodiments, the motor power supply operator 39 includes the plug-in key 39A and the button 39B. However, the motor power supply operator 39 does not need to include the plug-in key 39A. That is to say, the motor power supply operator 39 may include only the button 39B.

(7) In the above-described example embodiments, the case 39C has the drainage hole 39Ca. However, the case 39C does not need to include the drainage hole 39Ca.

(8) In the above-described example embodiments, the controller 41 is provided inside the cover 40. However, the controller 41 does not need to be provided inside the cover 40. That is to say, the controller 41 may be provided at a position different from a position inside the cover 40.

Example embodiments of the present invention are applicable not only to tractors but also to combines, rice transplanters, and utility vehicles (multi-purpose vehicles). While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle, comprising:
   a battery;
   a motor drivable by power from the battery;
   a travel device drivable by the motor;
   a steering wheel operable to change an orientation of the travel device;
   an operation panel below the steering wheel; and
   a motor power supply operator to turn on and off supply of the power to the motor; wherein
   the motor power supply operator is on the operation panel and overlapping the steering wheel as viewed along a rotation axis of the steering wheel;
   the motor power supply operator includes a plug-in key, a button, and a case of the plug-in key; and
   the case of the plug-in key includes a drainage hole provided in a bottom of the case to drain water which has entered an interior of the case of the plug-in key.

2. The electric work vehicle according to claim 1, wherein the supply of the power to the motor is permitted in response to the plug-in key being plugged in; and the button being pressed with the plug-in key plugged in turns on and off the supply of the power to the motor.

3. The electric work vehicle according to claim 1, wherein the motor power supply operator is inward of an outer circumference of the steering wheel.

4. The electric work vehicle according to claim 1, wherein the motor power supply operator is spaced apart from a work device operator configured to operate a work device.

5. The electric work vehicle according to claim 1, wherein the operation panel includes a meter panel, and the motor power supply operator is proximate to the meter panel.

6. The electric work vehicle according to claim 1, wherein the motor power supply operator is to left or right of the rotation axis.

7. The electric work vehicle according to claim 1, further comprising:
   a cover covering the operation panel; and
   a controller inside the cover and connected to the motor power supply operator.

* * * * *